Oct. 24, 1944.  E. M. SCHARENBERG  2,360,899
BUILDING FORM
Filed July 22, 1941
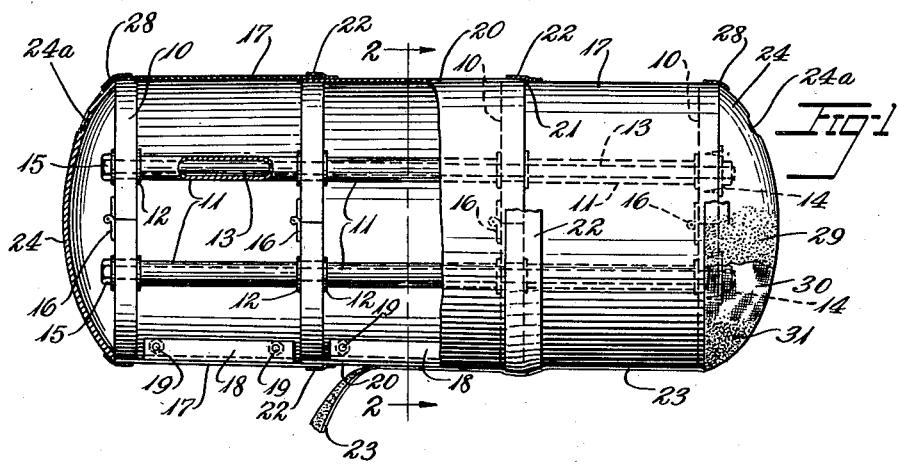
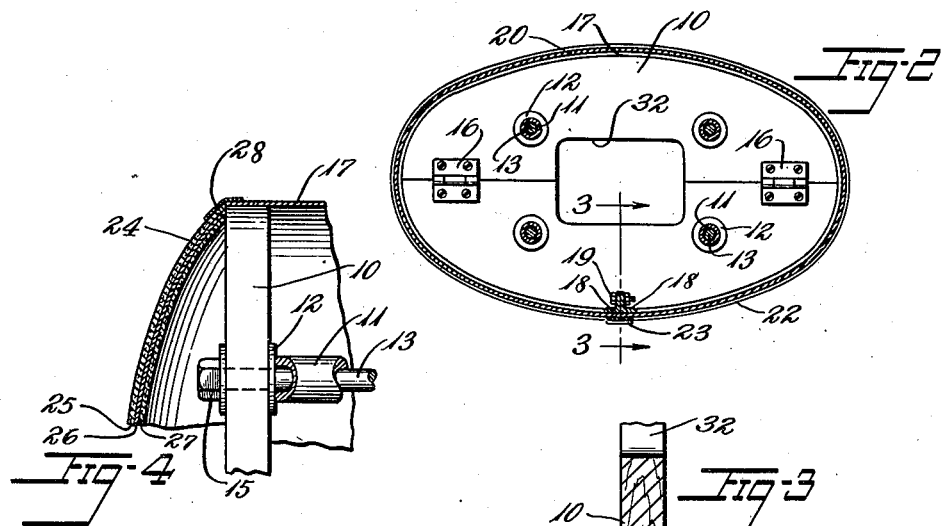
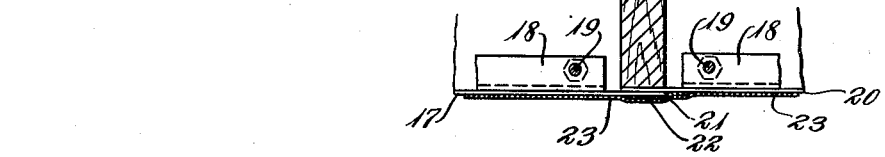
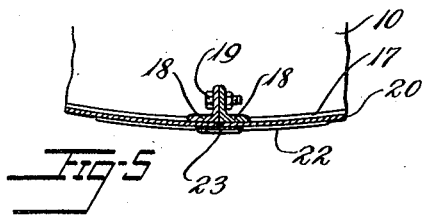
Inventor
Elmer M. Scharenberg
By Willis F. Avery
Atty.

Patented Oct. 24, 1944

2,360,899

UNITED STATES PATENT OFFICE 2,360,899

BUILDING FORM

Elmer M. Scharenberg, Everett, Ohio, assignor to The B. F. Goodrich Company, New York, N. Y., a corporation of New York Application July 22, 1941, Serial No. 403,547

3 Claims. (Cl. 18—45)

This invention relates to a building form for the construction of hollow articles built up from laminations of flexible or resilient material; it has as its chief object the provision of a durable, light-weight building form for such articles as self-sealing fuel tanks made from sheets of rubber or the like, said building form being easily removable from the finished tank through a small opening.

Forms for the construction of hollow articles have been made from easily destructible materials such as cardboard, strawboard, papier-mâché or the like. Forms such as these, however, must be destroyed in order to remove them from the finished article. The fact that these forms can be used only once makes the cost of the finished article undesirably high. I have found this building form to be of particular value in the construction of substantially completely enclosed hollow articles like self-sealing fuel tanks, such as those used on airplanes or other mobile instruments of modern warfare. However, my invention is obviously adapted to be used for the construction of any other hollow article built from rubber-like material.

The building forms for these articles must be not only easily removable, but must also be sufficiently sturdy to permit the construction of a laminated tank thereon, a process which entails rolling each successive layer to ensure adhesion to the next layer below it. Since the finished tank is cured, that is, the vulcanizable rubber-like portions are vulcanized by heat, before removal of the form, the latter must be able to withstand temperatures up to about 300° F. or more. Moreover, the form must provide a surface with sufficient building tack so that the innermost layer of the tank construction can be laid on without any wrinkles or trapped air between it and the form. Failure to provide a smooth and even inner layer leads to the formation of blisters between the layers and to the separation of the plies during the curing operation with subsequent weakening of the tank. After completion of the vulcanization, the adhesion between the form and the tank must be such that the form can be cleanly removed, leaving no scraps adhering to the inner surface of the tank which might later contaminate the contents.

I have now invented a building form which is durable and strong, which can be used repeatedly, and which is adapted to be compressed or coiled up into a small space to facilitate its removal from the interior of a hollow article through a small hand-hole. In one modification it is constructed as shown in the accompanying drawing.

In this drawing

Fig. 1 is a side elevation partly cut away and in section;

Fig. 2 is a cross-section taken along line 2—2 of Fig. 1;

Fig. 3 is a cross section on an enlarged scale taken along line 3—3 of Fig. 2;

Fig. 4 is a side elevation on an enlarged scale, partly cut away and in section, of one corner of Fig. 1;

Fig. 5 is a portion of the lower part of Fig. 2 on an enlarged scale.

In Fig. 1 partitions 10 may be constructed of wood, metal, hard rubber, or other similar material. They are substantially parallel to each other at any convenient distance apart, and are held in spaced relationship by sleeves 11 on the ends of which are fixed flanges 12. Any convenient number of partitions may be used for a given form, all of them being firmly held together by bolts 13 which extend through all of the partitions and which screw into fittings 14 on the end partition. The heads 15 of the bolts are on the outside of the partition at the other end of the assemblage in order to facilitate their removal. The bolt-heads 15 and fittings 14 may be countersunk to provide a smooth surface if desired. The partitions 10 are provided with hinges 16 at their midsection so that they likewise may be readily removed from the finished tank, although any other form of collapsible supporting member is satisfactory. Sheet metal 17, or a sheet of similar strong and flexible material such as flexible hard rubber or a synthetic plastic wide enough to extend between two or more partitions and equal in length to the circumference of the partitions is wrapped around the edges of the partitions 10. The metal or other sheet material is held in place by attaching angle irons 18 to its abutting ends and drawing the angle irons together by means of bolts and nuts 19. In order to ensure rigid construction it is usually desirable to lap each two adjacent metal sheets 17, 20 at their junction 21 on the partition 10. It is desirable that the form present a smooth and unbroken exterior surface. For this reason the overlapping edges of the metal sheets 17 and 20 are usually covered with an adhesive tape. A pressure-sensitive adhesive tape with a paper or fabric backing may be used, although it is preferred to use a metal foil 22, such as aluminum or lead foil, cementing it to the metal surface with any suitable adhesive such as a cement of rubber or synthetic resin. A similar tape 23 may be used to cover the gap between the two adjacent ends of the circumferential metal sheets which are pulled together by angle irons 18.

The external surfaces of the end partitions themselves may be used as the surface of the ends of the building form if desired. However, if a rounded end is desired, it has been found that a shell or framework constructed of a readily destructible fibrous material such as cardboard, millboard, strawboard, or the like is suitable. The end piece may be molded from papier-mâché or other similar material if desired. In the modification shown in the drawing, the end-pieces 24 are premolded to fit exactly over the ends of the form and depressions 24a are molded into the surface in order to permit accurate positioning of the fixtures.

Referring to Fig. 4, the outer layer 25 of the shell 24 is composed of papier-mâché; the intermediate layer 26 is plaster of Paris or other similar stiffening material; the inner layer 27 is papier-mâché. The edge of the shell is cut at an angle so as to fit flat against the surface of partition 10. The shell may be conveniently held in place by an adhesive tape 28 such as the rubber-faced cellulose known as Scotch tape.

In order to provide building tack on the surface of the fibrous portions of the form so that the inner layer of the article to be built on the form may be laid on without wrinkling, it is desirable to apply a layer of non-curing cement, such as latex cement, which when dry provides sufficient tack for that purpose, but which does not set up or cure into the fabricated article itself so that the form cannot be readily removed. Because of the low tear resistance of the papier-mâché or cardboard shell, small pieces tend to remain adhered to the inner surface of the finished article. This difficulty may be overcome by applying to the external surface of the shell a sheet of highly tear-resistant material, such as a fabric, natural or synthetic, or a film of cellulose ester or ether, or of a synthetic resinous material, which will not set up or cure into the inner layer of the article to be fabricated. In the modification shown, thin cotton sheeting 30 is adhered to the surface of the papier-mâché shell by means of a suitable cement 29, such as ordinary rubber cement; the sheeting is then covered with a layer of non-curing latex cement 31 which provides building tack.

An outstanding advantage of using molded papier-mâché end pieces is that fixtures, such as those used for inlets or outlets to the tank or other article, may be accurately positioned by means of depressions molded into the end piece at the time of its construction. This device eliminates the need for making laborious measurements on each new form, and ensures accurate duplication on a large scale.

Means for removing the form after completion of the article must be provided in the form of an opening in the end wall of the fabricated article large enough so that the bolts 13 and partitions 10, after folding, may be readily withdrawn together with the coiled-up flexible shells. The opening may be either built into the article, or more conveniently, cut into the end wall after completion. Smaller openings 32 as shown in Fig. 2 may be provided in the center of each partition 10 to facilitate removal of sleeves.

The building form of my invention is adapted to be constructed in either conical or cylindrical shapes. It may be circular or oval in cross-section, or its cross section may be any other closed curve, even approaching a square or a triangle.

In practice a building form of the desired size and shape is constructed according to the foregoing description, and the requiste number of plies of the rubber-like material are applied to its surface, being fitted around the inlet, outlet, vent, etc., fixtures. The whole article, while still on the building form, is then wrapped with wet cloth tape to prevent separation of the plies during cure and heated in air at a temperature of 250 to 300° F. to cure the vulcanizable rubber-like portions. After cooling and removal of the cloth tape an opening is cut in the end wall adjacent to the heads 15 of the bolts 13 unless an opening had already been constructed in that position before the tank was cured. The papier-mâché shell 24 is easily removed by cracking it into small pieces; complete removal of all the scraps is assured by removal of the fabric 30. Bolts 13 may then be unscrewed from their sockets 14 and removed through the opening. Sleeves 11 are taken out through the opening 32 in the partitions, and the partitions themselves, after being folded along the hinged joint, are also taken out. Removal of bolts 19 then permits the metal sheets 17, 20, etc. to be coiled up into a small volume to facilitate their passage through the small opening in the end wall of the article. The shell 24 at the opposite end of the tank from that in which the opening is cut may be removed just as was the first one. To complete the article, the handhole used for removal of the form may be closed by any suitable method, as by riveting, sewing, or cementing a piece of similar construction and of the proper size to the finished article.

I claim:

1. A building and curing form for a substantially completely enclosed hollow article of vulcanizable rubber-like material, said form comprising a thin-walled substantially cylindrical shell of flexible material divided longitudinally for removal from a relatively small end opening of said article in spirally rolled condition, and a collapsible skeletal framework for supporting said shell from within by contact therewith at widely separated zones of small area, said shell being self-supporting between said zones to an extent permitting assembly of the rubber-like material thereon, and rigid molded end-pieces of readily destructible fibrous material covering the ends of the cylindrical form.

2. A building and curing form for a substantially completely enclosed hollow article of vulcanizable rubber-like material, said form comprising a plurality of thin-walled substantially cylindrical shells of flexible material divided longitudinally for removal from a relatively small end opening of said article in spirally rolled condition, said shells overlapping at their junctions, a collapsible skeletal framework for supporting said shells from within by contact therewith at the junctions of the shells, said shells being self-supporting between the junctions to an extent permitting assembly of the rubber-like material thereon, and rigid molded end-pieces of readily destructible fibrous material covering the ends of the cylindrical form.

3. A building and curing form for a substantially completely enclosed hollow article of vulcanizable rubber-like material, said form comprising a plurality of thin-walled substantially cylindrical shells of flexible material, said shells having separable longitudinal joints for removal of the shells, in spirally rolled condition, through an end opening in said article having an area substantially less than the cross-sectional area of said article, said shells overlapping at their junctions, and a plurality of inner supporting partitions in substantially continuous contact with the shells over a narrow circumferential zone at the junctions of the shells, said supporting partitions having hinge joints permitting said partitions to be folded and withdrawn through said end opening, hollow longitudinal spacing members extending between said partitions substantially normal to the surface thereof, longitudinal tension members extending through said spacing members and through said partitions, and bearing on the end partitions to form a rigid structure, and molded dome-shaped end pieces of readily destructible fibrous material covering the exterior of the end partitions, the edges of said dome-shaped pieces being in substantially continuous abutting relationship with the circumference of said partitions.

ELMER M. SCHARENBERG.